US008045017B2

(12) United States Patent
Shan (10) Patent No.: US 8,045,017 B2
(45) Date of Patent: Oct. 25, 2011

(54) METHODS AND SYSTEMS FOR DETECTING FLASH RATE OF SURROUNDING LIGHTS FOR CONTROLLING CAMCORDER FRAME RATE

(75) Inventor: Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1360 days.

(21) Appl. No.: 10/850,824

(22) Filed: May 20, 2004

(65) Prior Publication Data

US 2005/0259162 A1 Nov. 24, 2005

(51) Int. Cl.
*H04N 9/73* (2006.01)
(52) U.S. Cl. .................................... 348/227.1
(58) Field of Classification Search ............. 348/227.1
See application file for complete search history.

(56) References Cited

U.S. PATENT DOCUMENTS

| 4,495,415 | A | | 1/1985 | Kawabata |
| 4,833,525 | A | | 5/1989 | Suzuki et al. |
| 5,128,708 | A | * | 7/1992 | Murayama et al. ........... 396/168 |
| 5,293,238 | A | * | 3/1994 | Nakano et al. ............. 348/226.1 |
| 5,319,449 | A | * | 6/1994 | Saito et al. ................ 348/223.1 |
| 5,394,217 | A | * | 2/1995 | Gaboury et al. ............. 396/233 |
| 5,960,153 | A | * | 9/1999 | Oster et al. ................. 386/117 |
| 5,990,937 | A | * | 11/1999 | Masayoshi ..................... 348/64 |
| 6,271,884 | B1 | * | 8/2001 | Chung et al. ................. 348/370 |
| 7,010,324 | B2 | * | 3/2006 | Ho et al. .................... 455/556.1 |
| 7,133,075 | B2 | * | 11/2006 | Ishida et al. ................... 348/312 |
| 2002/0041704 | A1 | * | 4/2002 | Yamamoto .................... 382/154 |
| 2002/0097328 | A1 | * | 7/2002 | Henderson et al. ........... 348/241 |
| 2003/0201760 | A1 | | 10/2003 | Umemoto |
| 2004/0201729 | A1 | * | 10/2004 | Poplin et al. ............... 348/226.1 |

FOREIGN PATENT DOCUMENTS

JP 2003234198 8/2003

OTHER PUBLICATIONS

Hurwitz et al., IEEE ISSCC, pp. 90-91, 436, Solid-State Circuits Conference, 2001. Digest of Technical Papers. ISSCC. 2001 IEEE International, ISBN: 0-7803-6608-5.*
Hurwitz et al., IEEE ISSCC, pp. 90-91,436, Solid-State Circuits Conference, 2001. Digest of Technical Papers. ISSCC. 2001 IEEE International, ISBN: 0-7803-6608-5.*
European Search Report, EP 05251033, Application No. 05251033. 6, mail date Apr. 7, 2009.

* cited by examiner

*Primary Examiner* — Nicholas Giles
*Assistant Examiner* — Usman Khan
(74) *Attorney, Agent, or Firm* — Blakely Sokoloff Taylor & Zafman LLP (57) ABSTRACT

Methods and systems for determining the frequency of the AC power supply of any pulsating light, such as fluorescent lights, for different purposes such as adjusting a camcorder's frame rate, is described in detail herein. In one embodiment a method is described that determines the frequency of the power supply, using a single sampling rate. In another embodiment two concurrent samplings of different rates are employed to determine the power supply frequency. Additionally, two exemplary systems describe the implementations of two embodiments of the presented methods.

35 Claims, 6 Drawing Sheets

$\omega_p$ = AC power supply frequency, Hz
$\omega_s$ = Sampling rate

METHODS AND SYSTEMS FOR DETECTING FLASH RATE OF SURROUNDING LIGHTS FOR CONTROLLING CAMCORDER FRAME RATE

TECHNICAL FIELD

The present invention relates in general to camcorders, and, in particular, to methods and systems for detecting flash rate of surrounding lights, such as fluorescent lights, to control the frame rate of the camcorder.

BACKGROUND

For the past two decades, camcorders, or video camera-recorders, have been a familiar sight throughout the world. They have been particularly in demand in the United States, Japan, Europe, and many other countries because they are inexpensive while extremely useful for numerous purposes. Camcorders and digital still cameras both take pictures using image sensors such as charge-coupled devices (CCD) or CMOS devices. To create a video signal, a camcorder image device must take many pictures every second, which the camera then combines to give the impression of movement. Analog camcorders contain two basic parts: (1) a camera section, consisting of an image sensor, lens and motors to handle the zoom, focus and aperture; and (2) a VCR section, which is a typical but small TV VCR. The function of the camera components is to receive visual information and transform it to electronic video signals.

Digital camcorders have the same elements, but have an additional component that takes the analog information the camera gathers and transforms it to digital data. Digital camcorders are so popular because their recorded information is not as prone to degradation, such as fading, as that of analog cameras. Video information in digital form can also be loaded onto computers, and easily edited, copied, and e-mailed.

The lens in a camcorder serves to focus light onto a small semiconductor image sensor. This sensor, such as a CCD, measures light with a small array of many tiny light-sensitive diodes, called photosites or pixels. Each photosite measures the amount of light that illuminates a particular point, and transforms this information into electrical charges. A brighter image is represented by a higher electrical charge, and a darker image is represented by a lower charge. An image sensor then creates a video picture by recording these light intensities.

Similarly, to create a color image, a camcorder has to detect the levels of each color of light. Since a full spectrum of colors can be created by combining the three colors red, green and blue, a camcorder only needs to measure the levels of these three colors to be able to reproduce full-color pictures. Some high-end camcorders use three separate chips to measure the intensity of these three basic colors while other less expensive camcorders get by with only one image sensor by fitting permanent color filters to individual photosites.

Camcorders in different parts of the world are designed in conformity with the local standards of pixel resolution, number of frames per second (fps), etc. The three most commonly used standards are NTSC, PAL, and SECAM. NTSC standard is used in North and South America, Japan, and 30 other countries. This standard requires 30-fps, 720×480 rectangular pixel resolution, and 575 scan lines. PAL format is used in Europe, Africa, the Middle East, Australia, China, and others and requires 25-fps, 720×576 rectangular pixel resolution, and 625 scan lines. Finally, SECAM format is used in France, the former Soviet Union countries, and others. It also requires 25-fps, 720×576 rectangular pixel resolution, and 625 scan lines.

It is important to note that in those countries in which a 50-Hz AC power system is used, the fps is 25 and in those with 60-Hz, the fps is 30. One main reason is the simplicity of design when the required number of aperture closures is an integer multiple or a factor of the power supply frequency. As a side benefit, it will synchronize the aperture closures with the surrounding pulsating lights, such as fluorescent lights. This synchronization makes the aperture opening coincide with the same light intensity of the pulsating light as in the previous openings.

On the other hand, if the aperture closures and the pulsating of the light are out of phase, the light intensity will vary at each aperture opening and will cause "flickering." This is the case when U.S.-made camcorders operate in Japan under fluorescent lights, or vice versa. There is a need for a camcorder that can automatically detect the frequency of the surrounding pulsating lights and can adjust its frame rate accordingly.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION

Embodiments of the methods and systems for detecting the frequency of any pulsating light, such as fluorescent lights, for different purposes such as adjusting a camcorder's frame rate are described in detail herein. In the following description, some specific details, such as the frequencies of the AC power supplies, are presented to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
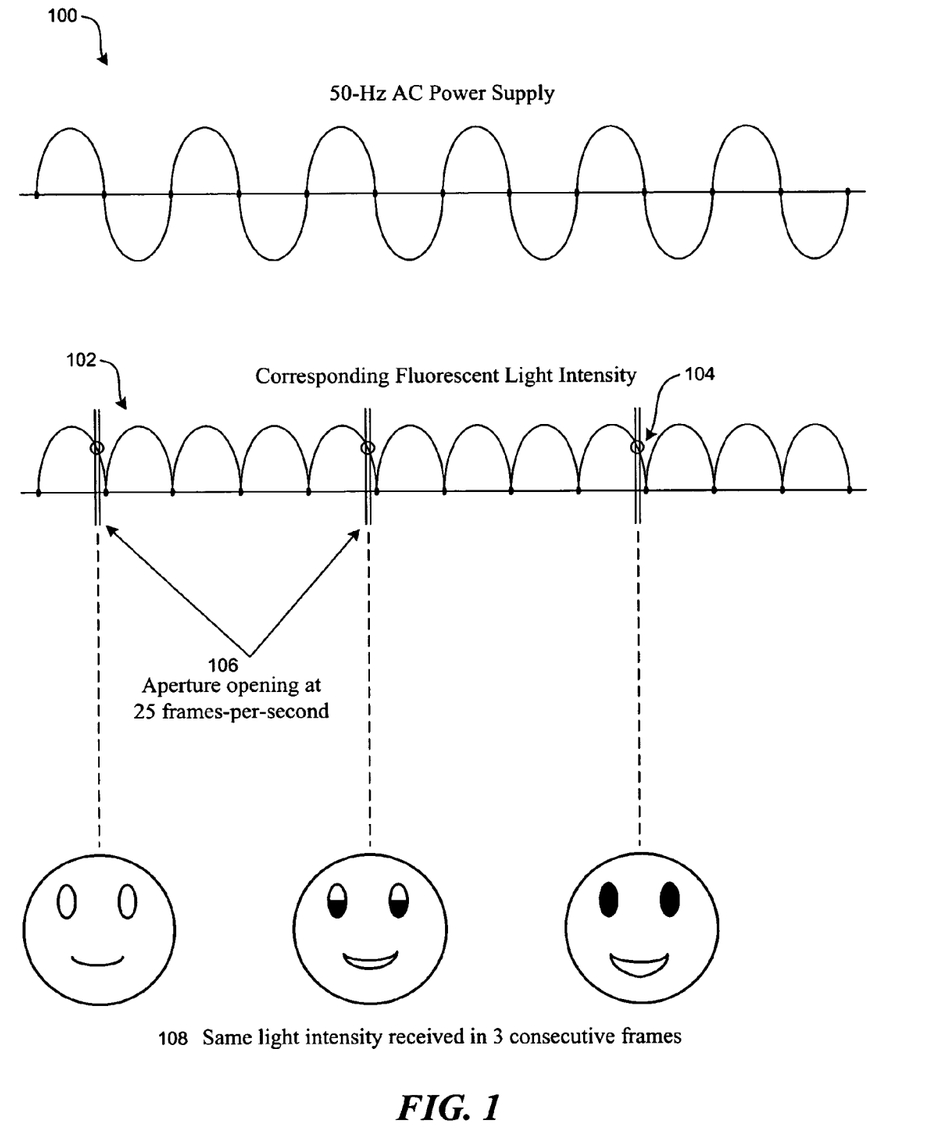
FIG. 1 is a schematic diagram of the result of a 25-fps camcorder operating under a fluorescent light with a 50-Hz AC power supply.

FIG. 1 is a schematic diagram of the result of a 25-fps camcorder operating under a pulsating light, such as a fluorescent light, with a 50-Hz AC power supply. The 50-Hz sinusoidal power supply 100 generates a light intensity 102 proportional to the rectified AC voltage. As a result, there are two flash cycles per each power supply AC cycle, or the light frequency is twice the power supply frequency.

If the fps rate of a camcorder, operating under such a light, is a factor of the light frequency—in other words, if the light frequency is an integer multiple of the camcorder's fps—the light intensity will be the same at all openings, 106, of the aperture. This is because the openings, 106, of the aperture are similar to sampling the light intensity at regular intervals. Therefore, samples are taken of similar points, 104, on the light intensity curve—assuming slow movement of the camcorder and of the object. Under such conditions, the constant light intensity, in turn, will result in a normal playback, 108.

Figure 2:
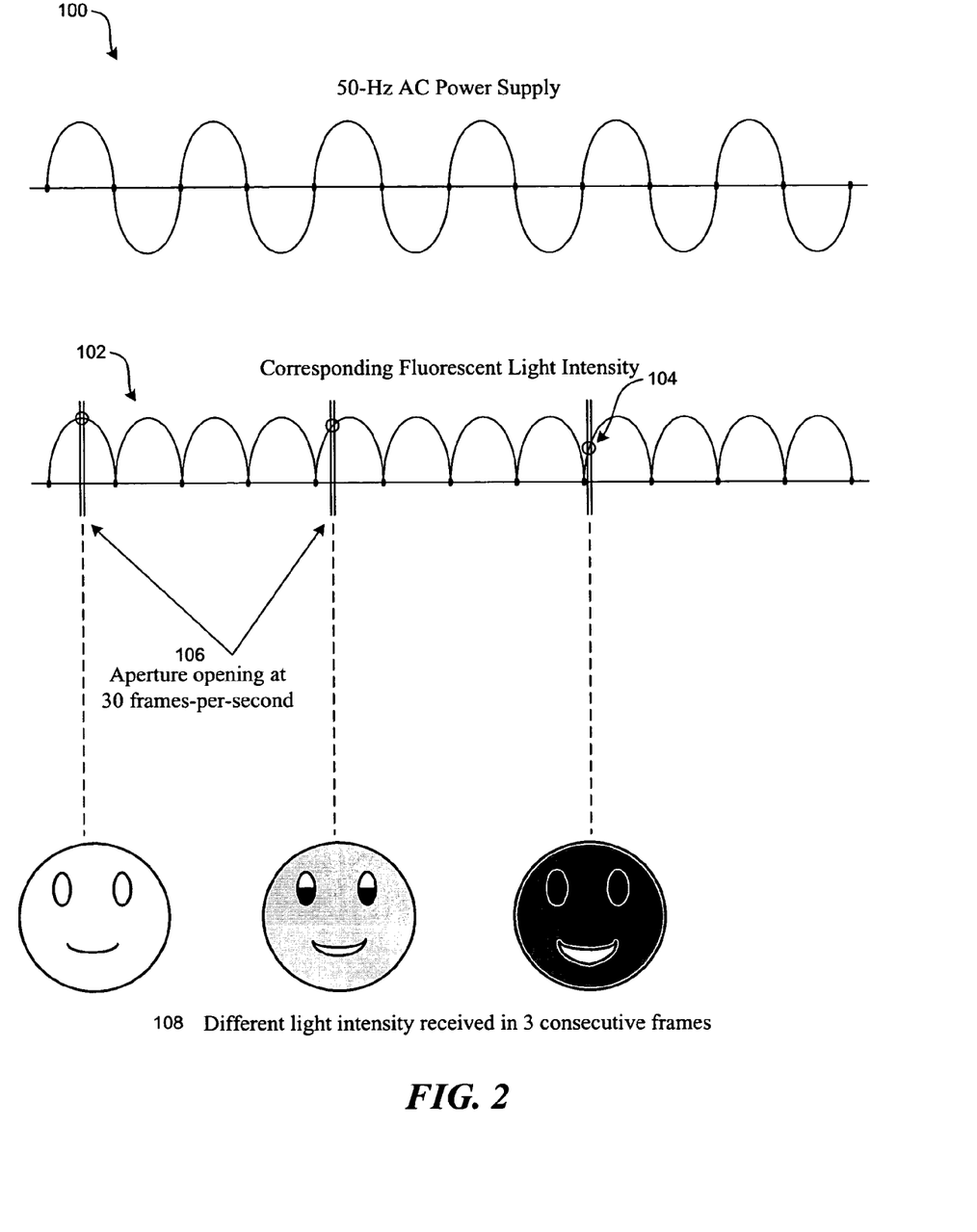
FIG. 2 is a schematic diagram of the result of a 30-fps camcorder operating under a fluorescent light with a 50-Hz AC power supply.

FIG. 2 is a schematic diagram of the result of a 30-fps camcorder operating under a pulsating light, such as a fluorescent light, with a 50-Hz AC power supply. If the fps rate of a camcorder, operating under such a light, is not a factor of the light frequency—in other words, if the light frequency is not an integer multiple of the camcorder's fps—the light intensity will not be the same at all openings, 106, of the aperture. Again, considering the opening of the aperture to be similar to regular sampling of the light intensity, the samples are taken of different points, 104, of the light intensity curve—even assuming slow movement of the camcorder and of the object. This will result in a flickering playback, 108.

Figure 3:
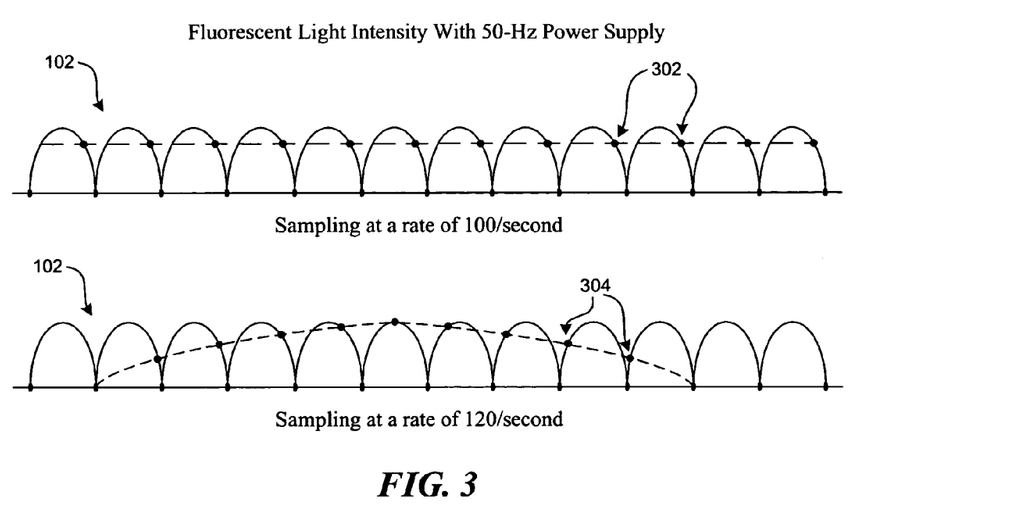
FIG. 3 is a schematic diagram of the light intensity of a fluorescent light with a 50-Hz AC power supply, sampled at the rates of 100 and 120 per second.

In one embodiment of the present invention, the camcorder is equipped with a light sensor that takes 120 samples of the light intensity per second. The light sensor may be, for example, a dedicated pixel formed on the image sensor. If this camcorder operates, for a single second, in a location with fluorescent lights and a 60-Hz AC power supply, it will collect 120 readings of the light intensity, 302, which are more or less the same, FIG. 3. However, if the same camcorder operates in a location with fluorescent lights and a 50-Hz AC power supply, its readings of the light intensity will vary in time, 304. It will be shown in the following paragraphs that the sensor readings in the latter case belong to a rectified sinusoidal function of time with a lower frequency than that of the power supply.

If, by any of the several possible methods, the readings of the above sensor are determined to be time-varying, then it can be concluded that the AC power supply is not 60-Hz; or that it is 50-Hz if it is the only other possibility. But if the readings of this sensor are determined not to be time-varying, then it can be concluded that the AC power supply is 60-Hz. One of the many possible methods is to subtract each new reading from the previous one and observe whether most of the readings' absolute values are within a tight tolerance or are more than a specified number. If they remain within the tolerance, they are not varying with time, and if they are more than a specific number, they are time-varying. Another possible method is to compute and compare the slopes of the lines passing through adjacent pairs of the readings, with specific requirements for non-time-varying and time-varying slopes, etc.

Figure 4:
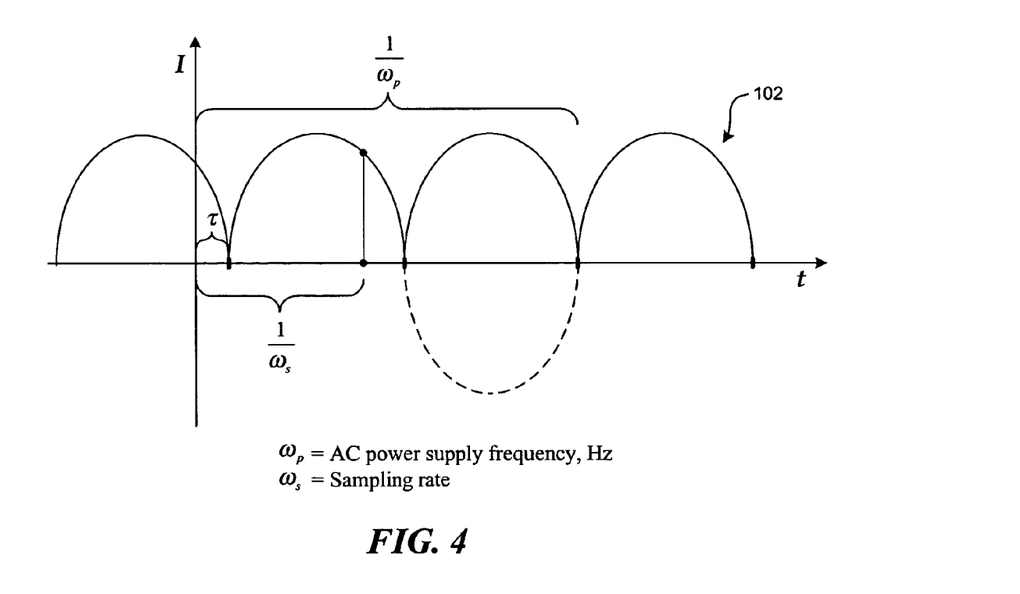
FIG. 4 is a graph of the light intensity of a fluorescent light with a $\omega_p$-Hz AC power supply, sampled at a rate of $\omega_s$ per second.

FIG. 4 is the graph of the light intensity of a fluorescent light with a $\omega_p$-Hz AC power supply, sampled at a rate of $\omega_s$ per second. In this figure the rectified sinusoidal curve 102 represents the light intensity as a function of time. Light intensity can be written as:

$$I = \alpha |\mathrm{Sin} 2\pi \omega_p (t-\tau)|$$

where I is the light intensity and $\omega_p$ is the AC power supply frequency, and $\alpha$ is the light intensity scale factor. If the sampling happens at the rate of $\omega_s$ per second ($1/\omega_s$ intervals), the sample readings of the light intensity will be:

$$I_n = \alpha \left| \mathrm{Sin} 2\pi \omega_p \left( \frac{n}{\omega_s} - \tau \right) \right|, n = 0, 1, 2, 3, \ldots$$

$$I_n = \alpha \left| \mathrm{Sin} \left( 2\pi n \frac{\omega_p}{\omega_s} - 2\pi \omega_p \tau \right) \right|$$

Here, if $\omega_s$ is a factor of $2\omega_p$, then I is merely a constant equal to $$I_n = \alpha |\mathrm{Sin} 2\pi \omega_p \tau|, \text{ for } 2\omega_p/\omega_s = 1, 2, 3, \ldots$$

$$= c, \text{ where c is a constant}$$

But if $\omega_s$ is not a factor of $2\omega_p$, then I represents a digitized and rectified sinusoidal function of time with a frequency of $\omega_p/\omega_s$.

In another embodiment of the present invention the sampling light sensor samples at a rate of 100 per second. For pulsating lights with a 50-Hz power supply, the samples will be almost the same, but for pulsating lights with a 60-Hz power supply, the samples will be time-varying. The frequency of the digitized and rectified sinusoidal function representing these varying samples is $\omega_s/\omega_p$. With this sensor we can ascertain whether or not the power supply is 50-Hz. And if it is not, in most cases it would be 60-Hz.

In yet another embodiment, to determine the frequency of the power supply, the camcorder is equipped with two sensors, such as two pixels, one sampling at 120 samples per second and the other at 100 samples per second. Ideally these sensors should be situated close to each other. If the 120-sample sensor shows a nonvarying reading and the other does not, then the frequency of the power supply is 60-Hz, and if the 100-sample sensor shows a nonvarying reading and the other does not, then the frequency of the power supply is 50-Hz. If the samples of both sensors are time-varying or both are not time-varying, the system should not make a decision and should continue taking more samples.

In yet another embodiment of the invention, the average variations of the readings from both sensors are computed for n samples or for m seconds. The smaller average indicates a nonvarying reading and the larger average indicates a varying reading. In yet another embodiment these averages may be used only if they differ by a certain amount. In yet another embodiment these averages may be used only if the smaller one is less than a first amount and the larger one is more than a second amount, where the second amount is more than the first one. As mentioned above, many more methods are contemplated by the inventors to check whether or not the samples are time-varying. The above mentioned methods are merely some examples.

The above description of the embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For instance, while specific component values are provided herein, it is to be appreciated that these values are for the sake of illustration and explanation. Various embodiments of the invention may utilize values that are different from what is specified herein.

Figure 5:
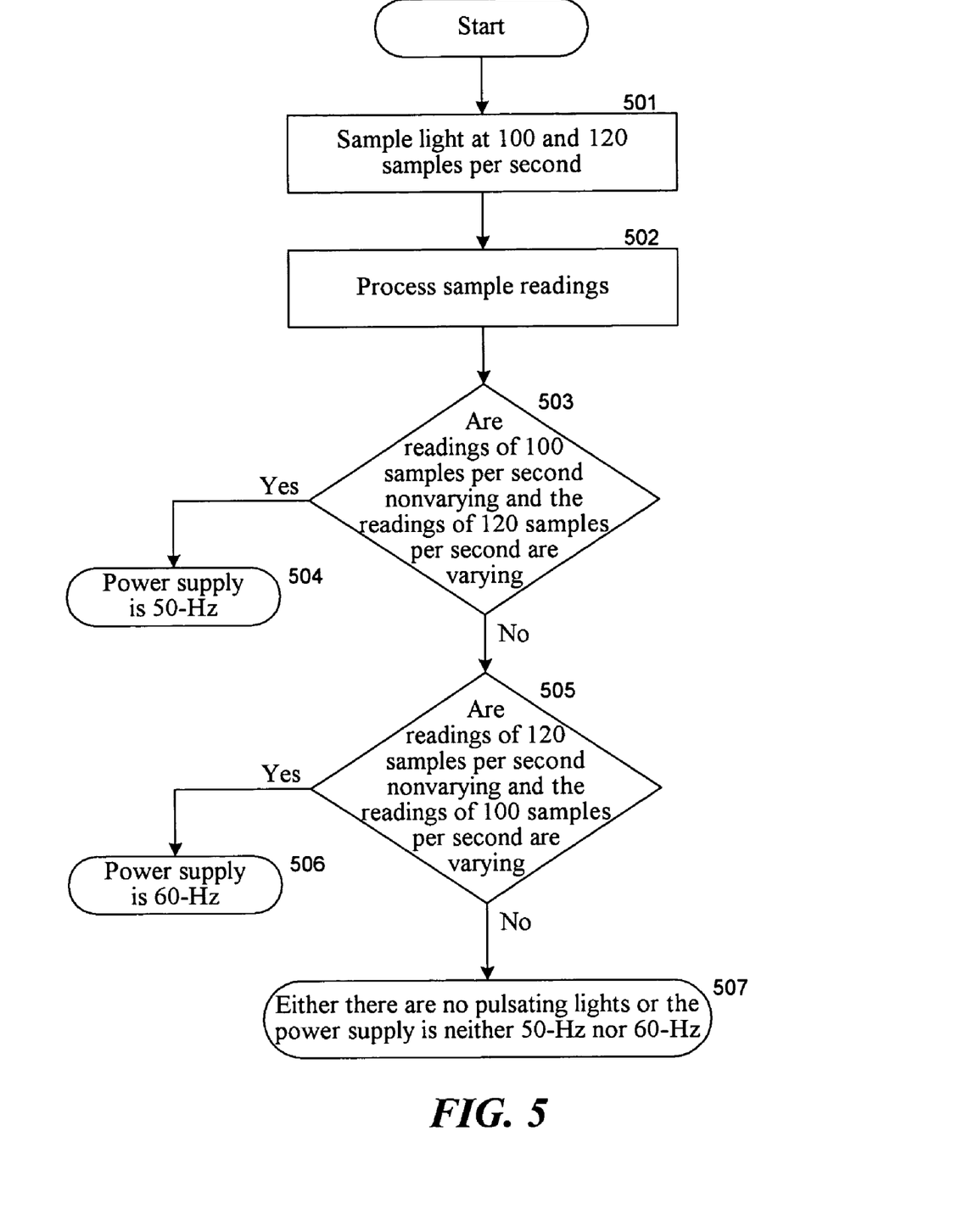
FIG. 5 is a flow diagram of the power supply frequency determination method in accordance with an embodiment of the present invention.

FIG. 5 is a flow diagram of the power supply frequency determination method in accordance with an embodiment of the present invention. At step 501 the light is sampled by two different light sensing devices, one at a rate of 100 samples per second and the other at a rate of 120 samples per second. The values of these samples are passed to a processor at step 502, where it is determined whether either sample set is nonvarying.

At step 503 a decision is made based on the processor computations. At this step, if the readings of the light sensor with 100 samples per second are determined to be nonvarying and the readings of the other sensor to be varying, a signal is generated indicating that the power supply is at 50-Hz. This determination, at step 504, will be used to control the camcorder's aperture speed. At step 505 also a similar decision is made based on the processor computations. At this step, if the readings of the light sensor with 120 samples per second are determined to be nonvarying and the readings of the other sensor to be varying, a signal is generated indicating that the power supply is at 60-Hz. This determination, at step 506, will be used to control the camcorder's aperture speed. If at steps 503 and 505 the samples of the two sensors are determined to be both varying, then the power supply is not operating at 50 or 60-Hz. But if both readings are determined to be nonvarying, then there is no pulsating lights around.

Figure 6:
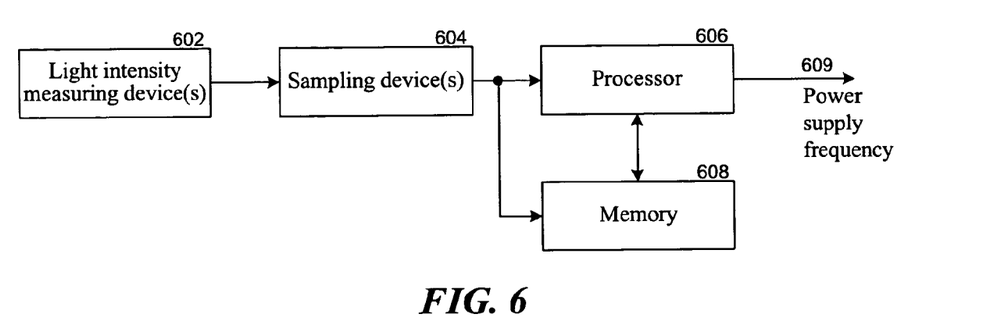
FIG. 6 is a schematic diagram of an exemplary system in accordance with an embodiment of the present invention.

FIG. 6 is a schematic diagram of an exemplary system in accordance with an embodiment of the present invention. In this simple system, the light intensity measuring device 602 measures the intensity of the surrounding light of the camcorder. The sampling device 604 may be a part of the light sensing device or a separate functional module capable of sampling the continuous reading of the measuring device 602. The resulting light intensity samples will be processed by a processor 606 which may be as simple as a clocked logic circuit along with a memory element of 608. The processing of the sampled light intensity will determine the frequency at which the power supply operates.

Figure 7:
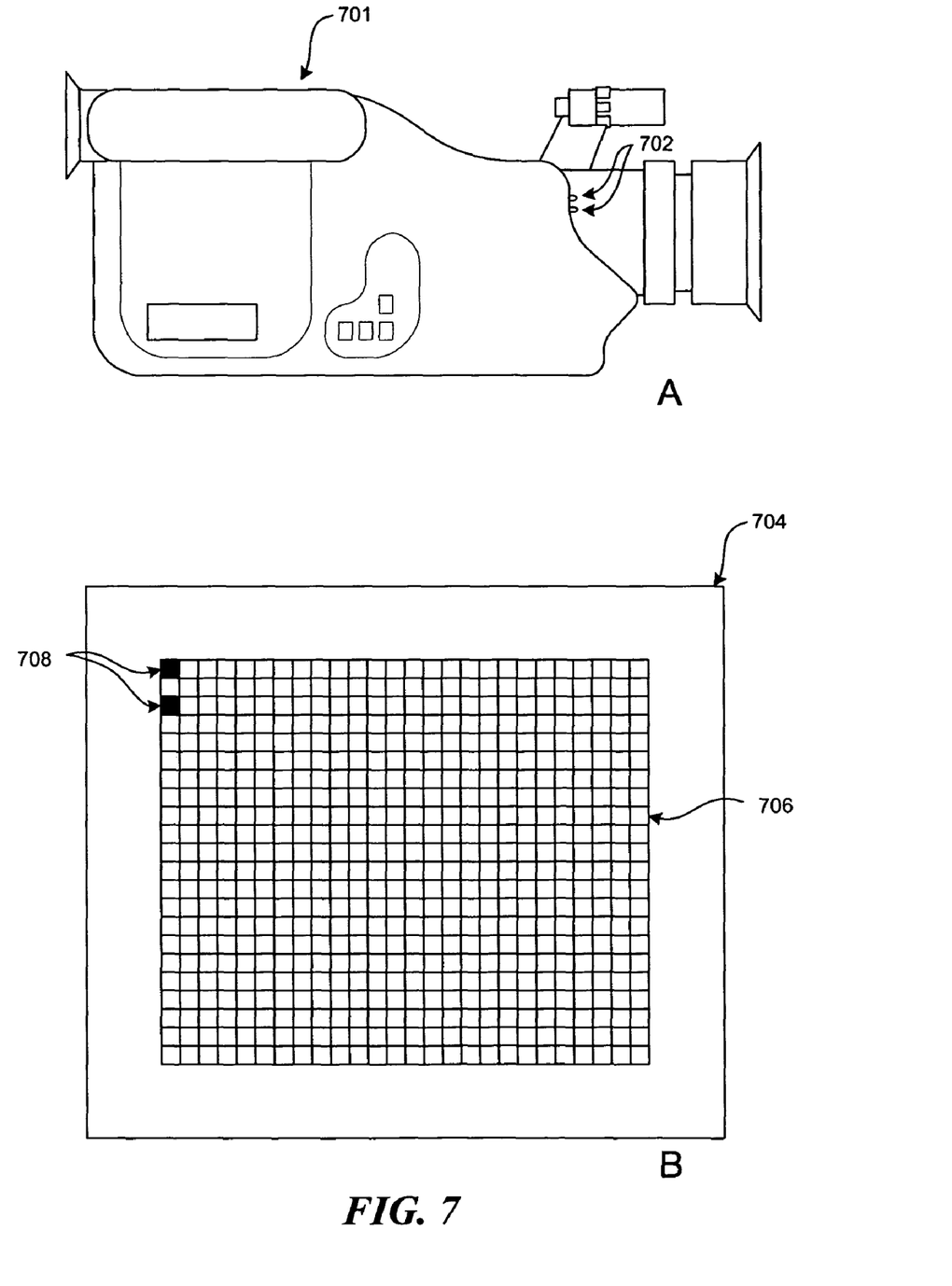
FIG. 7 depicts two exemplary implementations of the light sampling method in accordance with two different embodiments of the present invention.

FIG. 7 depicts two exemplary implementations of the light sampling method in accordance with two different embodiments of the present invention. In FIG. 7A, two light sensors 702 are mounted on the camcorder 701, near the lens, to sample the surrounding light at two different sampling rates. In FIG. 7B, the two sensors 708 are a part of the pixel array 706 of the camcorder's image sensors 704, with the same function as the two sensors mounted on the camcorder in FIG. 7A.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

I claim:

1. A method of detecting a frequency of a pulsating light connected to an AC power supply, comprising:
    simultaneously using a first dedicated pixel to collect a first sample of an intensity of the pulsating light at a first sampling frequency that is an integer multiple of a first known pulsating light frequency and a second dedicated pixel to collect a second sample of the intensity of the pulsating light at a second sampling frequency that is an integer multiple of a second known pulsating light frequency;
    determining, in the time domain, whether the intensity in the first sample is time-varying and whether the intensity in the second sample is time-varying;
    concluding, if the intensity of the first sample is not time-varying and the intensity of the second sample is time varying, that the frequency of the pulsating light is an integer multiple of the first sampling frequency; and
    concluding, if the intensity of the second sample is not time-varying and the intensity of the first sample is time varying, that the frequency of the pulsating light is an integer multiple of the second sampling frequency.

2. The method of claim 1 wherein the pulsating light is a fluorescent light.

3. The method of claim 1 wherein the first sampling frequency is a factor of 100, and wherein if the intensity in the first sample is not time-varying, concluding that the frequency of the pulsating light is 50 Hz.

4. The method of claim 1 wherein the second sampling frequency is a factor of 120, and wherein if the intensity in the second sample is not time-varying, concluding that the frequency of the pulsating light is 60 Hz.

5. A camcorder implementing the method of claim 1 to control the camcorder's frame speed.

6. The method of claim 1 wherein the pulsating light flashes at each half cycle of the AC power supply.

7. The method of claim 1, further comprising concluding, if neither the first sample nor the second sample are time-varying, that there are no pulsating lights or that the frequency of the pulsating lights is neither the first known pulsating light frequency or the second known pulsating light frequency.

8. A method of determining whether a pulsating light is connected to a 50-Hz or to a 60-Hz AC power supply, comprising:
    simultaneously using a first dedicated pixel to collect a first sample of an intensity of the pulsating light at 100 samples per second and a second dedicated pixel to collect a second sample of the intensity at 120 samples per second;
    determining, in the time domain, whether the intensities in the first and second samples are time-varying;
    concluding that the frequency of the pulsating light is 50 Hz if the first sample is not time-varying and the second sample is time-varying; and
    concluding that the frequency of the pulsating light is 60 Hz if the second sample is not time-varying and the first sample is time-varying.

9. The method of claim 8 wherein the pulsating light is a fluorescent light.

10. A camcorder implementing the method of claim 8 to control the camcorder's frame speed.

11. The method of claim 8 wherein the pulsating light flashes at each half cycle of the AC power supply.

12. The method of claim 8, further comprising concluding, if neither the first sample nor the second sample are time-varying, that there are no pulsating lights or that the frequency of the pulsating lights is neither 50 Hz nor 60 Hz.

13. A system of determining whether a pulsating light is connected to a 50-Hz or to a 60-Hz AC power supply, comprising:
    an image sensor including first and second dedicated pixels for measuring the intensity of the pulsating light;
    a memory element;
    a processing element; and
    an arrangement in which:

the light intensity is simultaneously sampled by the first dedicated pixel at a first sampling rate that is a factor of 100 to produce a first sample and by the second dedicated pixel at a second sampling rate that is a factor of 120 to produce a second sample;

the first and second samples are kept in the memory;

the first and second samples are processed in the time domain to determine if they are time-varying;

if the first sample is not time-varying and the second sample is time-varying, the processing element concludes that the frequency of the pulsating light is 50 Hz; and if the second sample is not time-varying and the first sample is time-varying, the processing element concludes that the frequency of the pulsating light is 60 Hz.

14. The system of claim 13 wherein the processing element further concludes, if neither the first sample nor the second sample are time-varying, that there are no pulsating lights or that the frequency of the pulsating lights is neither 50 Hz nor 60 Hz.

15. A method of operating an image recording device, comprising:

detecting a frequency of a pulsating light connected to an AC power supply, the pulsating light being external to the image recording device, wherein detecting the frequency of the pulsating light comprises:

simultaneously using a first dedicated pixel to collect a first sample of an intensity of the pulsating light at a first sampling frequency that is an integer multiple of a first known pulsating light frequency and a second dedicated pixel to collect a second sample of the intensity of the pulsating light at a second sampling frequency that is an integer multiple of a second known pulsating light frequency, determining, in the time domain, whether the intensity in the first sample is time-varying and whether the intensity in the second sample is time-varying, concluding, if the intensity of the first sample is not time-varying and the intensity of the second sample is time varying, that the frequency of the pulsating light is an integer multiple of the first sampling frequency, and concluding, if the intensity of the second sample is not time-varying and the intensity of the first sample is time varying, that the frequency of the pulsating light is an integer multiple of the second sampling frequency;

setting an aperture speed of the image recording device to be an integer multiple of the detected frequency of the pulsating light; and recording an image with the image recording device at the set aperture speed.

16. The method of claim 15 wherein determining whether the sampled intensity is time-varying further includes determining whether successive samples of the sampled intensity are nearly the same.

17. The method of claim 15 wherein the first sampling frequency is a factor of 100, and wherein if the intensity in the first sample is not time-varying, concluding that the frequency of the pulsating light is 50 Hz.

18. The method of claim 15 wherein the second sampling frequency is a factor of 120, and wherein if the intensity in the second sample is not time-varying, concluding that the frequency of the pulsating light is 60 Hz.

19. The method of claim 15 further comprising averaging variations of the sampled intensities from the first and second dedicated pixels.

20. The method of claim 15 wherein the image recording device is a camcorder or a video camera recorder.

21. The method of claim 15, further comprising concluding, if neither the first sample nor the second sample are time-varying, that there are no pulsating lights or that the frequency of the pulsating lights is neither the first known pulsating light frequency or the second known pulsating light frequency.

22. A system for recording images, comprising:

an image sensor including first and second dedicated pixels for measuring the intensity of a pulsating light;

a sampling device coupled to the first dedicated pixel to collect a first sample of the measured intensity at a first sampling frequency that is an integer multiple of a first known pulsating light frequency and coupled to the second dedicated pixel to simultaneously collect a second sample of the measured intensity at a second sampling frequency that is an integer multiple of a second known pulsating light frequency;

a processor in electrical communication with the sampling device and the first and second dedicated pixels, the processor having a computer-readable medium containing instructions that cause the processor to perform a method comprising:

determining, in the time domain, whether the intensity in the first sample is time-varying and whether the intensity in the second sample is time-varying, concluding, if the intensity of the first sample is not time-varying and the intensity of the second sample is time varying, that the frequency of the pulsating light is an integer multiple of the first sampling frequency, and concluding, if the intensity of the second sample is not time-varying and the intensity of the first sample is time varying, that the frequency of the pulsating light is an integer multiple of the second sampling frequency;

setting an aperture speed of the image recording device to be an integer multiple of the detected frequency of the pulsating light; and recording an image with the image recording device at the set aperture speed.

23. The system of claim 22 wherein determining whether the sampled intensity is time-varying further includes determining whether successive samples of the sampled intensity are nearly the same.

24. The system of claim 22 wherein the first sampling frequency is a factor of 100, and wherein if the intensity in the first sample is not time-varying, concluding that the frequency of the pulsating light is 50Hz.

25. The system of claim 22 wherein the second sampling frequency is a factor of 120, and wherein if the intensity in the second sample is not time-varying, concluding that the frequency of the pulsating light is 60Hz.

26. The system of claim 22, further comprising averaging variations of the sampled intensities from the first and second image sensors.

27. The system of claim 22 wherein the system is a camcorder or a video camera recorder.

28. The system of claim 22 wherein the pulsating light is a fluorescent light that flashes at each half cycle of the AC power supply.

29. The system of claim 22 wherein the processing element further concludes, if neither the first sample nor the second sample are time-varying, that there are no pulsating lights or that the frequency of the pulsating lights is neither the first known pulsating light frequency or the second known pulsating light frequency.

30. A camcorder, comprising:
an image sensor including first and second dedicated pixels for measuring the intensity of a pulsating light external to the camcorder;
a sampling device coupled to the first dedicated pixel to collect a first sample of the measured intensity at a first sampling frequency that is an integer multiple of a first known pulsating light frequency and coupled to the second dedicated pixel to simultaneously collect a second sample of the measured intensity at a second sampling frequency that is an integer multiple of a second known pulsating light frequency;
a processor in electrical communication with the sampling device and the first and second dedicated pixels, the processor having a computer-readable medium containing instructions that cause the processor to perform a method comprising:
determining, in the time domain, whether the intensity in the first sample is time-varying and whether the intensity in the second sample is time-varying,
concluding, if the intensity of the first sample is not time-varying and the intensity of the second sample is time varying, that the frequency of the pulsating light is an integer multiple of the first sampling frequency, and
concluding, if the intensity of the second sample is not time-varying and the intensity of the first sample is time varying, that the frequency of the pulsating light is an integer multiple of the second sampling frequency;
synchronizing an aperture speed of the camcorder with the detected frequency of the pulsating light: and
recording an image with the camcorder at the set aperture speed.

31. The camcorder of claim 30 wherein determining whether the sampled intensity is time-varying further includes determining whether successive samples of the measured intensity are nearly the same.

32. The camcorder of claim 30 wherein if the first sampling frequency is a factor of 100, and the intensity of the first sample is not time-varying, concluding that the frequency of the pulsating light is 50Hz, and wherein if the second sampling frequency is a factor of 120, and the sampled intensity of the second sample is not time-varying, concluding that the frequency of the pulsating light is 60 Hz.

33. The camcorder of claim 30 wherein synchronizing an aperture speed of the camcorder includes setting the aperture speed of the camcorder to be an integer multiple of the detected frequency of the pulsating light.

34. The camcorder of claim 30 wherein determining whether the sampled intensity is time-varying includes:
determining a difference between each new sample and the previous sample; and
determining whether the absolute values of the differences fall within a tolerance.

35. The camcorder of claim 30, further comprising concluding, if neither the first sample nor the second sample are time-varying, that there are no pulsating lights or that the frequency of the pulsating lights is neither the first known pulsating light frequency or the second known pulsating light frequency.

* * * * *